April 12, 1960            E. L. NASH            2,932,220
THREE SPEED COMBINATION TRANSMISSION AND AXLE
Filed March 5, 1956
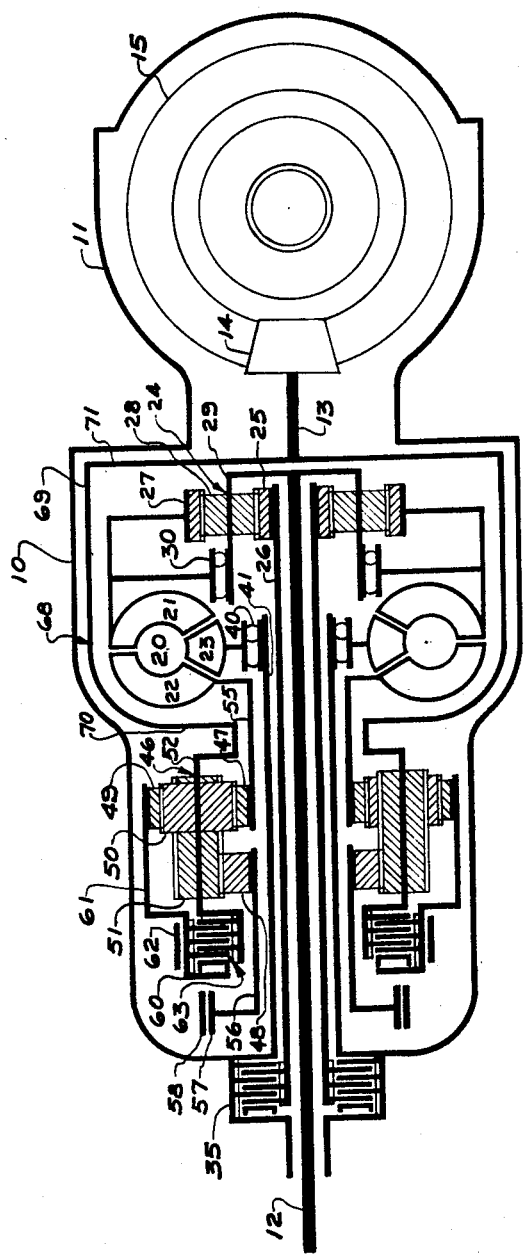
INVENTOR.
Edward L. Nash
BY
Wilson, Redrow & Sadler

United States Patent Office 2,932,220
Patented Apr. 12, 1960

2,932,220

THREE SPEED COMBINATION TRANSMISSION AND AXLE

Edward L. Nash, Ferndale, Mich., assignor to Studebaker-Packard Corporation, Detroit, Mich., a corporation of Michigan Application March 5, 1956, Serial No. 569,360

1 Claim. (Cl. 74—732)

This invention relates to automatic transmissions for automotive vehicles and other vehicles.

The invention relates particularly to an automatic transmission having a housing which is adapted to be positioned immediately adjacent the differential housing of a vehicle and fixedly attached thereto. If the transmission of an automotive vehicle can be positioned near the differential housing of the vehicle, the tunnel or hump in the frame and floor of the vehicle, which is normally provided just behind the engine to accommodate the transmission, can be eliminated.

It is a main object of the invention to provide a new and improved automatic transmission for automotive vehicles and other vehicles.

Another object of the invention is to provide a new and improved automatic transmission having a housing which is adapted to be positioned immediately adjacent and fixedly attached to the differential housing of a vehicle.

Other objects of the invention will become apparent from the following specification, the drawing relating thereto, and the appended claim.

In the drawing there is shown in side elevation a schematic view of a new and improved automatic transmission embodying the present invention.

In the drawing the transmission is shown as having a main housing 10. In the illustrated embodiment of the invention main housing 10 is shown as being positioned immediately adjacent and rigidly attached to a differential housing 11. It will be understood, however, that the new and improved transmission of the present invention also has general utility and need not necessarily be used in combination with a differential housing in the manner illustrated.

In general, and for convenience in describing the illustrated embodiment of the invention, the left side of the transmission is referred to as the input end and the right side of the transmission is referred to as the output end.

The transmission housing 10 and the differential housing 11 form a rigid unit which may represent a sprung or unsprung mass depending upon the design of the suspension system of the vehicle in which the transmission of the present invention is incorporated. Transmission housing 10 is generally cylindrical in shape and is somewhat larger at the output end thereof than at the input end. Transmission housing 10 and the components therein are designed so that the outer diameter of housing 10 is as small as practicable so that as much road clearance as possible is obtained.

A transmission drive shaft 12 is provided for receiving torque transmitted from the engine of the vehicle to the transmission. Drive shaft 12 extends from the input end of the transmission to a point just short of the output end of the transmission. A driven shaft 13 is provided at the output end of the transmission which is colinear with drive shaft 12 and is provided with a pinion 14 which engages a differential ring gear 15 in power transmitting relation.

Fluid power transmitting means is provided which may be a fluid coupling within the scope of the invention but is illustrated herein by way of example as a converter 20. Converter 20, as illustrated herein, comprises an impeller 21, a turbine 22 and a reaction member 23.

Driving means 24 are operably disposed between drive shaft 13 and impeller 21 for driving the converter. The driving means are illustrated herein by way of example as a planetary speed-up gear set 24 although a solid coupling may be utilized in other embodiments of the invention. Speed-up gear set 24 comprises a sun gear 25 fixedly attached to an annular sleeve 26, a ring gear 27 fixedly connected to impeller 21, planet gears 28 disposed between sun gear 25 and ring gear 27 in meshing engagement therewith, and a planet gear carrier 29 having one end thereof fixedly connected to drive shaft 12, and an overrunning clutch 30 operably disposed between the other end of planet carrier 29 and impeller 21.

Speed-up gear set 24 provides two speed ratios between drive shaft 12 and converter impeller 21. A friction coupling 35 is provided between annular sleeve 26 and the case or housing 10 and, when coupling 35 is applied to hold sun gear 25 stationary with the case, impeller 21 is overdriven by drive shaft 12 by a ratio such as 1.5 or 1.6, for example. When coupling 35 is disengaged, the overrunning clutch 30 becomes operative to drive ring gear 27 at the same speed as the cage or planet gear carrier 29 to produce a one to one speed ratio between drive shaft 12 and impeller 21.

Reaction member 23 is operably connected to the case or housing 10 through an overrunning clutch 40 and a stationary annular sleeve member 41 in a conventional manner.

Operably disposed between converter turbine 22 and driving shaft 13 is a main planetary gear set 46. The main gear set 46 includes a rear sun gear 47, a front sun gear 48, a ring gear 49, planets 50 disposed between rear sun gear 46 and ring gear 49 and in meshing engagement therewith, planets 51 disposed between front sun gear 48 and planets 50 and in meshing engagement therewith, and a compound cage or planet gear carrier 52 upon which planets 50 and 51 are rotatably disposed and carried.

The rear sun gear 47 is fixedly connected to turbine 22 through an annular sleeve 55. The front sun gear 48 may be selectively locked to the case or housing 10 through a rotatable annular sleeve 56, a drum 57, and a friction brake 58 which is engageable with drum 57.

Ring gear 49 has associated therewith a drum 60, connectable thereto by a rotatable annular sleeve 61, and a friction brake 62 which is engageable with drum 60 for selectively locking ring gear 49 to the case or housing 10. Operably disposed between ring gear 49 and one end of planet gear carrier 52 is a friction clutch 63 for selectively locking these members together.

Cage or planet gear carrier 52 has attached thereto an output member 68 which extends around the outside of converter 20 and is operably connected to driven shaft 13. As illustrated herein output member 68 includes, by way of example, an axially extending portion 69 and radially extending portions 70 and 71 which connect output member 68 to cage 52 and the driven shaft 13. It is the output member 68 which transmits power from the main planetary gear set 46 to pinion 14 which drives differential ring gear 15. The output member 68, by reason of its extending around converter 20 may be utilized as a housing for converter 20 and this is a primary feature of the invention.

In the operation of the transmission the speed-up gear set 24, if it is used instead of a solid coupling, may be operated selectively to provide two speed ratios at that stage by operating the friction coupling 35 so that impeller 21 is either overdriven by drive shaft 12 or driven at the same speed as drive shaft 12 through overrunning clutch 30.

Referring to the main planetary gear set 46, low speed, high torque operation is obtained by applying brake 58 to drum 57 to lock the front sun gear 48 to the case. Brake 62 and clutch 63 are disengaged and there is a speed reduction through the planetary gearing 46 as rotary motion is transmitted from impeller 22 through rear sun gear 47 to the cage or planet gear carrier 52. The rotary motion of cage 52, which may represent a reduction on the order of about 1.8 for example, is transmitted around converter 20 through the axially extended portion 68 of cage 52 to driven shaft 13.

High speed operation is obtained by releasing brake 58 to permit rotation of front sun gear 48, applying clutch 63 so that cage 52 and ring gear 49 are locked together, and maintaining brake 62 in its released position. This has the effect of causing cage 52 and ring gear 49 to rotate together and produces a higher speed ratio. The gearing may be designed to produce a one to one ratio between rear sun gear 47 and cage 52, for example.

Reverse operation is obtained by releasing brake 58 to permit rotation of front sun gear 48, releasing clutch 63 between ring gear 49 and cage 52, and applying brake 62 to lock ring gear 49 to the case. The compound or double planetary pinions 50 and 51 produces reversed rotation of the cage 52 relative to the rotation of rear sun bear 47. As mentioned above, pinions 50 are in mesh with pinions 51.

Reference is now made to the general positioning of the components of the transmission. Converter 20 is arranged so that impeller 21 faces the input or left end of the transmission and turbine 22 faces the output or right end of the transmission. Speed-up gear set 24 is positioned between the converter 20 and the output end of the transmission. The main gear set 46 is positioned between the converter 20 and the input end of the transmission. The drive from turbine 21 is transmitted to the gear set 46 and from cage 52 of gear set 46 through output member 68 around the converter 20 and speed-up gear set 24 to the driven shaft 13. Output member 68 is preferably in the form of a housing which functions as a housing for converter 20.

The feature of driving into converter 20 from the speed-up gear set 24 and directing the output from the main gear set 46 around the outside of converted 20 has the effect of turning the transmission around backwards for space utilization without reversing the components of the transmission or necessitating the providing of a "left-handed" converter.

The invention may be embodied in other specific forms without departing from the spirit or essential characteristics thereof. The present embodiment of the invention is therefore to be considered in all respects as illustrative and not restrictive, the scope of the invention being indicated by the appended claim rather than by the foregoing description, and all changes which come within the meaning and range of equivalency of the claim are therefore intended to be embraced therein.

It is claimed and desired to secure by Letters Patent:

In a transmission, a main housing; a drive shaft; a driven shaft; a hydraulic torque converter operably disposed between said drive shaft and said driven shaft comprising an impeller, a turbine and a reactor, said reactor being operably connected to said housing through a one-way brake; a speed-up planetary gear set operably disposed between said drive shaft and said converter comprising a sun gear rotatably mounted relative to said main housing, a ring gear fixedly connected to said impeller, a planet gear disposed between and in mesh with said ring gear and said sun gear, a planet carrier fixedly connected to said drive shaft and operably connected to said ring gear through a one-way clutch; a friction brake disposed between said sun gear and said main housing; a main planetary gear set operably disposed between said turbine and said driven shaft comprising a first sun rotatably mounted relative to said housing, a second sun operably connected to an driven by said turbine, a main ring gear, a compound planet gear having one set of planets in mesh with said second sun and said main ring gear and another set of planets in mesh with said first sun gear and said one set of planets, and a planet carrier having a portion thereof extending around the outside of said converter and being operably connected to said driven shaft in driving relation; a brake drum and friction brake set operably disposed between said first sun gear and said housing; a brake drum and a friction brake set operably disposed between said main ring gear and said housing; and a friction coupling disposed between said main ring gear and said carrier arm.

References Cited in the file of this patent

UNITED STATES PATENTS

| | | |
|---|---|---|
| 1,242,974 | Pinckney | Oct. 16, 1917 |
| 2,281,077 | Pollard | Apr. 28, 1942 |
| 2,351,213 | James | June 13, 1944 |
| 2,598,876 | Ash | June 3, 1952 |
| 2,687,657 | Kugel et al. | Aug. 31, 1954 |
| 2,693,260 | Lucia | Nov. 2, 1954 |